US007139270B1

(12) United States Patent
Fatehi et al.

(10) Patent No.: US 7,139,270 B1
(45) Date of Patent: Nov. 21, 2006

(54) SYSTEMS AND METHOD FOR TRANSPORTING MULTIPLE PROTOCOL FORMATS IN A LIGHTWAVE COMMUNICATION NETWORK

(75) Inventors: Mohammad T Fatehi, Middletown, NJ (US); Victor B Lawrence, Holmdel, NJ (US); Kazem A Sohraby, Lincroft, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 573 days.

(21) Appl. No.: 09/643,203

(22) Filed: Aug. 22, 2000

(51) Int. Cl.
*H04L 12/28* (2006.01)
*H04J 3/24* (2006.01)
(52) U.S. Cl. .................. 370/392; 370/474; 370/475
(58) Field of Classification Search ............... 370/389, 370/392, 395.1, 395.3, 395.52, 466, 469, 370/473–476, 535–537; 398/43, 45, 47–48, 398/49, 66
See application file for complete search history.

(56) References Cited

U.S. PATENT DOCUMENTS

| | | | | | |
|---|---|---|---|---|---|
| 4,831,616 | A | * | 5/1989 | Huber | 398/100 |
| 5,440,547 | A | * | 8/1995 | Easki et al. | 370/395.3 |
| 5,617,417 | A | * | 4/1997 | Sathe et al. | 370/394 |
| 5,734,589 | A | * | 3/1998 | Kostreski et al. | 715/716 |
| 5,796,720 | A | | 8/1998 | Yoshida et al. | 370/245 |
| 5,920,412 | A | | 7/1999 | Chang | 359/128 |
| 5,926,478 | A | * | 7/1999 | Ghaibeh et al. | 370/395.51 |
| 6,105,134 | A | * | 8/2000 | Pinder et al. | 713/170 |
| 6,219,358 | B1 | * | 4/2001 | Pinder et al. | 370/537 |
| 6,356,544 | B1 | * | 3/2002 | O'Connor | 370/353 |
| 6,434,154 | B1 | * | 8/2002 | Stacey et al. | 370/395.64 |
| 6,483,842 | B1 | * | 11/2002 | Mauger | 370/420 |
| 6,574,224 | B1 | * | 6/2003 | Brueckheimer et al. | 370/395.6 |
| 6,590,909 | B1 | * | 7/2003 | Stacey et al. | 370/537 |

(Continued)

FOREIGN PATENT DOCUMENTS

JP    0 821 509 A2    1/1998

OTHER PUBLICATIONS

"A Hybrid Data Transport Protocol for SONET/SDH and Direct Data Over Optical Networks" by Pankaj K. Jha, Cypress Semiconductor, U.S.A. ATM 2000. Proceedings of the IEEE Conference on High Performance Switching and Routing (Cat. No. 00$^{TH}$8485), ATM 2000. Proceedings of the IEEE Conference 2000 on High Performance Switching and Routing, Heidelberg, Germany, Jun. 26-29, 2000, pp. 13-23, XP002173986 2000, Piscataway, NJ, U.S.A., IEEE, U.S.A. ISBN: 0-7803-5884-8.

(Continued)

*Primary Examiner*—Chi Pham
*Assistant Examiner*—Tri H. Phan
(74) *Attorney, Agent, or Firm*—Gregory J. Murgia

(57) ABSTRACT

A heterogeneous mix of traffic having one or more protocol formats and supplied by one or more users or sub-networks is transported in a communication network by using digital containers that are routed and processed in network nodes interconnecting the users or sub-networks. A digital container includes a frame structure comprising a header section and a payload section, the header section including information for routing the digital container and for identifying the type of payload being carried. The payload section is capable of carrying one or more different types of traffic formatted according to one or more protocols, e.g., IP, ATM, and so on. Processing of the individual payload remains a user or sub-network responsibility while the less processor-intensive routing and processing of digital containers occurs at the network node level.

17 Claims, 11 Drawing Sheets

U.S. PATENT DOCUMENTS

| | | | |
|---|---|---|---|
| 6,594,266 B1 * | 7/2003 | Kim | 370/395.6 |
| 6,611,522 B1 * | 8/2003 | Zheng et al. | 370/395.21 |
| 6,621,821 B1 * | 9/2003 | Song | 370/395.6 |
| 6,819,679 B1 * | 11/2004 | Kerns et al. | 370/474 |
| 6,847,644 B1 * | 1/2005 | Jha | 370/392 |

OTHER PUBLICATIONS

"Switched High-Speed Service-Architecture and Impacts" by Monica A. Lazer, Bellcore, U.S.A. Proceedings of the Conference on Computer Communications (Infocom), U.S.A., New York, IEEE, vol. Conf. 11, Aug. 3, 1992, pp. 1004-1013, XP000300235, ISBN: 0-7803-0602-3.

"IP over SONET" by James Manchester et al. IEEE Communications Magazine, IEEE Service Center, Piscataway, NJ, U.S.A., vol. 36, No. 5, May 1, 1998, pp. 136-142, XP000752858, ISSN: 0163-6804.

U.S. Appl. No. 08/892,590, filed Jul. 14, 1997.

* cited by examiner

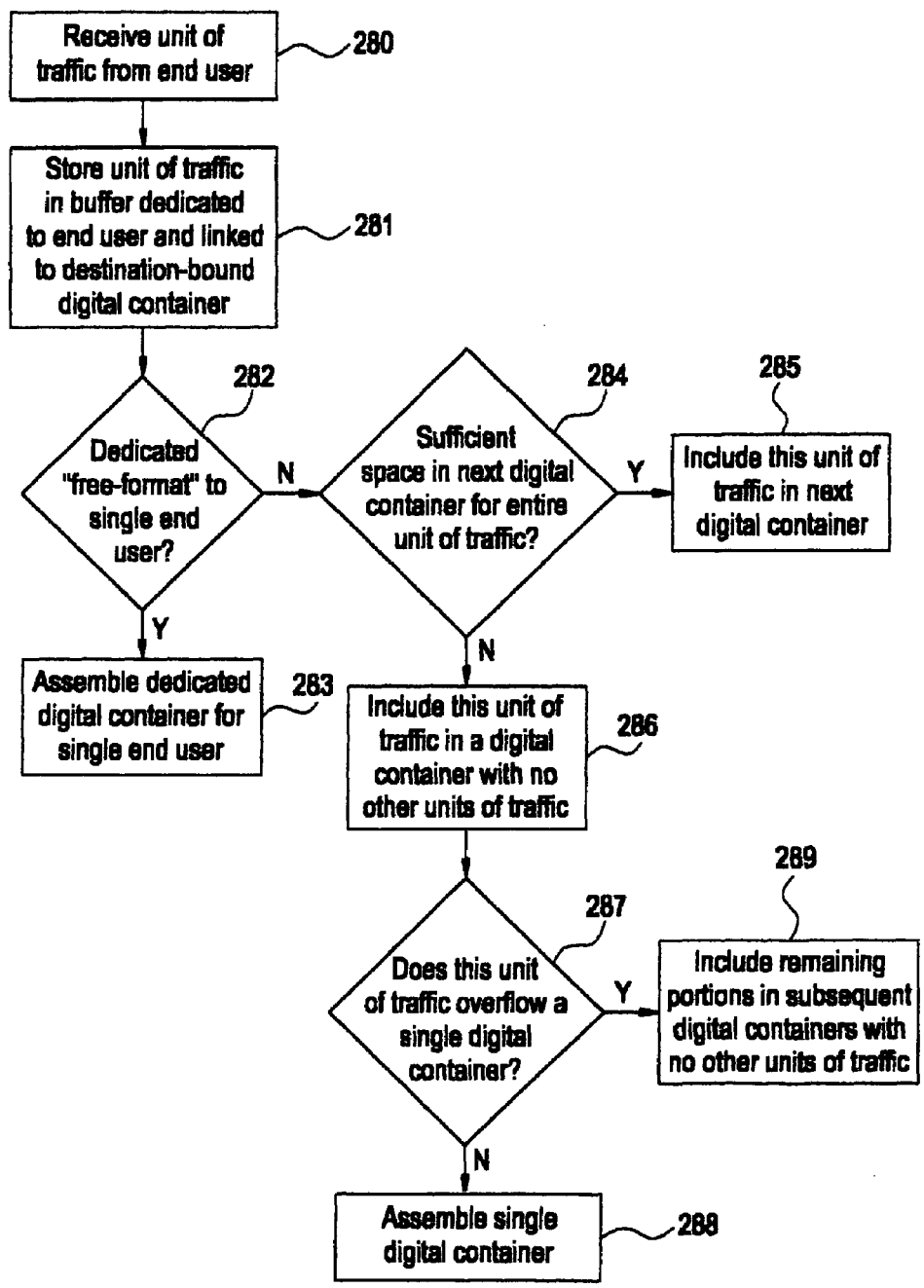

FIG. 7

Table 1 (500):

| Incoming OCLI (501) | Incoming Wavelength (502) | Dest. Ntwk Node (503) | Outgoing Wavelength (504) | Outgoing OCLI (505) |
|---|---|---|---|---|
| 3 | $\lambda_1$ | 105 | $\lambda_5$ | 15 |
| ... | ... | ... | ... | ... |
| 1 | $\lambda_{12}$ | 110* | - | - |

* This network node is the destination network node.

Table 2 (550):

| End User (551) | Ntwk Node (552) | Active/Inactive (553) |
|---|---|---|
| 106 | 105 | 1 |
| 107 | 105 | 0 |
| 111 | 110 | 1 |
| 112 | 110 | 0 |

SYSTEMS AND METHOD FOR TRANSPORTING MULTIPLE PROTOCOL FORMATS IN A LIGHTWAVE COMMUNICATION NETWORK

TECHNICAL FIELD

The invention relates generally to lightwave communication networks and, more particularly, to protocols used for transporting information in such networks.

BACKGROUND OF THE INVENTION

Communication networks must be capable of transporting extremely large amounts of information having different formats (e.g., voice, video, data, and so on) and at the highest speeds possible. As a result, flexible bandwidth management and efficient transmission protocols are essential elements in any network solution. Recent advances in communication technologies have assisted service providers in meeting the increasing demands being placed on today's networks. For example, optical fiber is fast becoming a transmission medium of choice for many communication networks because of the speed and bandwidth advantages associated with optical transmission. In addition, wavelength division multiplexing (WDM) is being used to obtain even more bandwidth and speed in today's optical transmission systems. In its simplest form, WDM is a technique whereby parallel data streams modulating light at different wavelengths are coupled simultaneously into the same optical fiber. By using optical transmission and WDM in the backbone networks, the communications industry has made great strides in terms of solving the bandwidth and speed problems.

However, an efficient transport protocol for carrying the various types of traffic across these optical communication networks continues to be an elusive problem. Although the type of traffic being transported or being planned for transport over these networks continues to evolve, one constant is that future networks need to be capable of carrying a mix of several traffic types in an efficient, flexible, and scalable manner. In general, the type of traffic transported in the networks can be characterized in two categories, mono-media whereby only one type of session is supported, and multimedia, whereby a session can be composed of multiple mono-media sessions. The former case is comparable to traditional circuit or packet networks where voice, data, or video sessions are established and traffic is carried. In the current Internet, early versions of multimedia sessions are observed. For example, upon gaining access to a server, an end user is permitted to access video and audio clips, exchange data, as well as establish real-time connections such as voice and video. Presently, two of the most common types of transport protocols are Asynchronous Transfer Mode (ATM) and Transmission Control Protocol/Internet Protocol (TCP/IP), referred hereinafter as IP. To capitalize on the benefits offered by ATM and IP, coupled with the many advantages associated with optical transmission, a great deal of effort is being applied to develop the most efficient manner for transporting ATM and IP traffic across today's optical communication networks.

Most existing optical transmission networks are based on the well-known Synchronous Optical Network (SONET)/Synchronous Digital Hierarchy (SDH) standard. Because the differences and similarities between SONET and SDH are well known, examples described hereinafter will only refer to SONET for simplicity of explanation. A common approach in today's networks is to use a SONET-based system for transporting the different types of traffic. For example, in SONET-based transport, information is formatted according to specified byte and frame structures in the electronic domain and then converted to optical format for transport as a serial bit stream over a lightwave communication system. In WDM, each wavelength channel therefore may carry such formatted traffic, but in parallel so that capacity significantly increases. One proposed approach for supporting the different traffic types) e.g., ATM and IP, is to use the standard SONET frame structure for carrying the ATM cells or IP packets. Although SONET transport has many advantages, SONET is not viewed as a long-term solution to optical communication networks which must support a mix of traffic types.

For example, SONET does not provide an explicit routing process at the cross-connects and/or switches/routers. SONET also does not provide a signaling capability for path setup between source/destination end devices for which communications should take place, e.g., application layer. Furthermore, in order to extract information from SONET payload, complex processing using embedded pointers in its path and section headers is required. With respect to carrying multiple traffic types, the SONET frame structure was not originally designed to handle ATM cells and IP packets and, as such, is not optimized for transmission of such formats.

Cost is also a significant factor in terms of supporting the addition of future services. In particular, a solution for transporting multiple traffic types should not require revamping the existing infrastructure. Future networks need to be transparent to the type of traffic being carried and new traffic types should be accommodated with, at most, minor modifications at the interface to the network infrastructure. Furthermore, capacity should be capable of being managed based on actual traffic demand, e.g., incrementally add or remove capacity.

SUMMARY OF THE INVENTION

A heterogeneous mix of traffic having one or more protocol formats and supplied by one or more users or sub-networks is transported in a communication network according to the principles of the invention by using digital containers that are routed among network nodes interconnecting the users or sub-networks. By packaging heterogeneous traffic into digital containers for transport through the network, processing of the individual payload remains a user or sub-network responsibility while the less processor-intensive routing and processing of digital containers occurs at the network node level.

According to one illustrative embodiment, a digital container includes a frame structure comprising a header section and a payload section, wherein the header section includes information for routing the digital container and for identifying the type of payload being carried. The payload section is capable of carrying one or more different types of traffic (e.g., packets, cells, etc) formatted according to one or more protocols, e.g., IP, ATM, and so on. More specifically, traffic supplied by user nodes may be formatted according to different protocols, e.g., one node may comprise an ATM switch, another node an IP Router, and so on. Traffic from each of the user nodes is combined in digital containers at a network node for transport over a core transport network via other network nodes. The units of traffic supplied by the user nodes remain in their original form when assembled into digital containers so that formatting, processing, and routing of the digital containers is greatly simplified. Because processing and routing of digital containers occurs at the network node level, a digital container according to the principles of the invention is therefore assembled so that payload contents only include traffic for user nodes serviced by the same network node.

By retaining the original protocol format of the traffic and routing this traffic in digital containers through the core transport network, costly replacement or modification of existing infrastructure (e.g., ATM switches, IP routers, etc) is avoided. Moreover, the processor-intensive task of processing individual payload (e.g., packets, cells, etc.) does not occur in the core transport network, thus improving the speed and throughput performance of the core transport network. As compared to prior transport schemes, such as SONET, the present invention does not require as much transmission overhead and overhead processing, allows for signaling to be used in the establishment of paths between end points, and enables transport of heterogeneous traffic having either variable or fixed size units of traffic.

BRIEF DESCRIPTION OF THE DRAWING

A more complete understanding of the invention may be obtained from consideration of the following detailed description of the invention in conjunction with the drawing in which:

FIG. 4 is a simplified flow diagram of the process for assembling digital containers at a source network node according to the principles of the invention;

FIG. 7 shows exemplary routing tables according to the principles of the invention;

DETAILED DESCRIPTION OF THE INVENTION

Although the illustrative embodiments described herein are particularly well-suited for a wavelength division multiplexed (WDM) network and shall be described in this exemplary context, those skilled in the art will understand from the teachings herein that the principles of the invention may also be employed in conjunction with other types of communication systems and networks. For example, the principles of the invention may be employed in single channel optical communication networks having various network topologies, e.g., ring networks, star networks, point-to-point networks, mesh networks, and so on. Accordingly, the embodiments shown and described herein are only meant to be illustrative and not limiting.

As used herein, the term "network node" is meant to refer to a node in a core transport network, that is a node directly connected to a backbone network such as a WDM optical network. By way of example, a core transport network may comprise a plurality of network nodes forming an optical network interconnected by optical fiber paths either using single wavelength transport or multi-wavelength transport (e.g., WDM). A network node typically would include optical line transmission equipment to terminate the optical fiber paths which carry the optical signals as well as some form of routing or switching device to route or switch incoming and outgoing optical signals.

The term "user node" is meant to refer to a node or equipment that is not necessarily directly connected to the core transport network, but rather is typically coupled between a network node and one or more users which supply traffic to be routed in the network. As such, the user node would typically provide some routing, switching, multiplexing, concentration or other equivalent function to transport traffic between users and the core transport network via the network nodes to which they are directly connected. A user node could represent a single entity, such as a single line providing transmission connectivity to a user such as a DS-3 link, for example. Alternately, a user node could represent a node in an access network (e.g., ATM switching node in an ATM network, IP router node in an IP network, etc.). The terms network node and user node are not meant to be limiting in a definitional sense, but rather are being used to simplify explanation and differentiation between the typical network hierarchy, e.g., core, access and so on.

Overview of Network Environment

Figure 1:
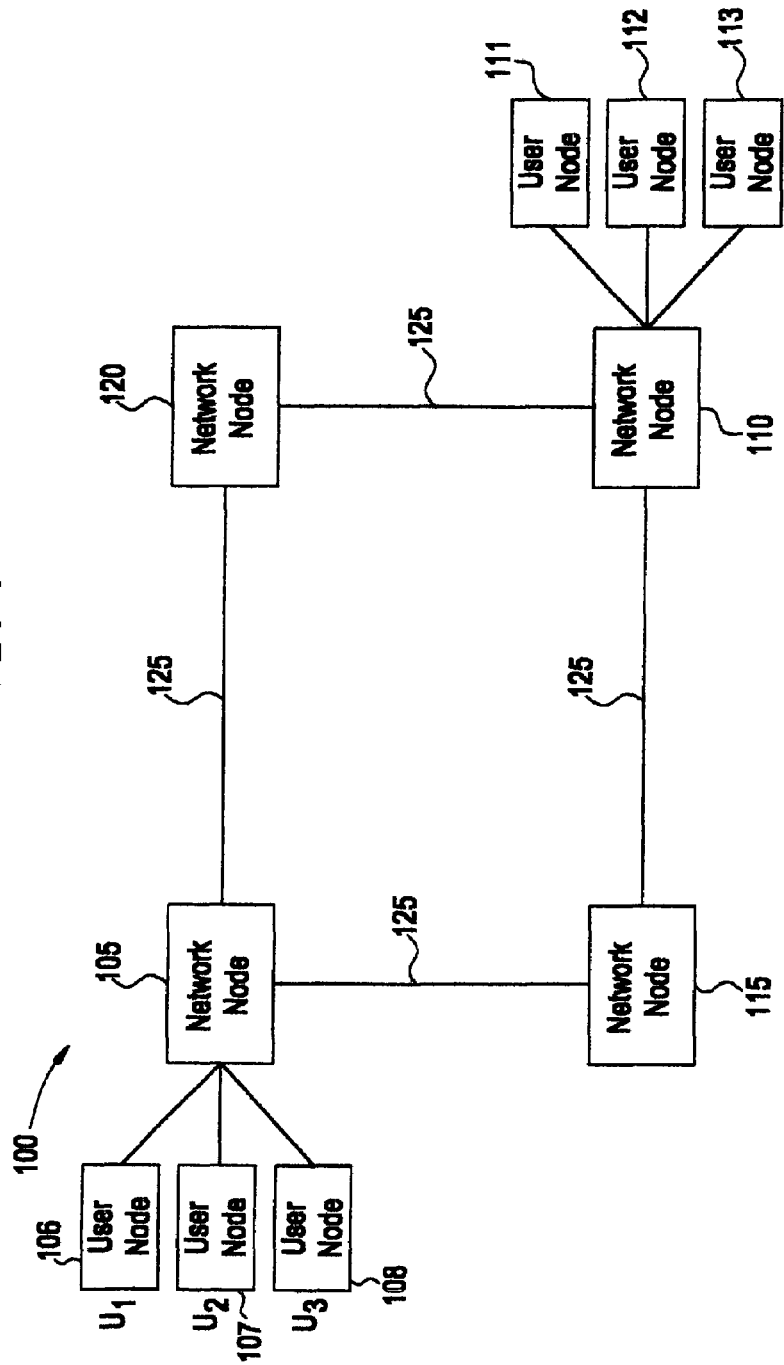
FIG. 1 is a simplified block diagram of a communication network in which the principles of the invention may be employed.

FIG. 1 is a simplified block diagram depicting a typical network 100 embodying an architecture in which the principles of the invention can be applied. As shown, network 100 includes network nodes 105, 110, 115, and 120 interconnected by optical fiber paths 125 to form the core transport network or backbone network. In this exemplary embodiment, network 100 is a WDM-based network whereby each of interconnecting paths 125 carries a WDM signal comprising a plurality of wavelength channels according to well-known WDM techniques.

In exemplary network 100, user nodes 106–108 are coupled to network node 105 and user nodes 111–113 are coupled to network node 110. As shown, each of the user nodes can be associated with one or more users denoted in FIG. 1 as $u_n$, where n is an integer. For simplicity of illustration and explanation, FIG. 1 only shows one user per user node, e.g., user $u_1$ sends and receives traffic through user node 106, user $u_2$ sends and receives traffic through user node 107, and user $u_3$ sends and receives traffic through user node 108. It should be noted that other network configurations will be apparent to those skilled in the art and are contemplated by the teachings herein. For example, the principles of the invention can be applied in many different network topologies which utilize a core transport network (typically higher capacity) with one or more access networks coupled at the edges of the core transport network to provide service to users, sub-networks, and so on.

As described, network nodes 105, 110, 115, and 120 and interconnecting optical fiber paths 125 constitute the core optical transport network while the user nodes coupled to each of the network nodes can be viewed as constituting an access network, e.g., those parts of the network that have a more direct interface to the users generating traffic to be transported in the core optical network. In terms of network function, network nodes 105, 110, 115, and 120 are used for routing optical signals in network 100 and for transporting traffic to and from the respectively coupled user nodes. In one embodiment, network nodes 105, 110, 115, and 120 may be optical cross-connects capable of cross-connecting traffic, supplied from and/or destined for particular user nodes, among various wavelength channels in the WDM signals being transported along optical fiber paths 125 in network 100. In terms of network function, user nodes 106–108 and 111–113 are contemplated as including any type of equipment that can multiplex or otherwise combine traffic from users and supply this traffic to the core optical network via a network node. By way of example only, user nodes may include such devices as circuit switches, packet switches, ATM switches, IP routers, Frame Relay switches, other terminal devices on customer premises equipment, and so on. As such, the traffic units supplied by user nodes in network 100 could be ATM cells, IP packets, DS-n signals, E1 signals, and so on. Of course, this exemplary configuration is only meant to be illustrative and not limiting since other types of network nodes (e.g., optical routers, opto-electronic cross-connects, electronic cross-connects, etc.) and other types of user nodes, now known or to be developed, can also be used in accordance with the principles of the invention and are therefore contemplated by the teachings herein.

Overview of Transport Scheme

The present invention encompasses a method and system supporting the transport, i.e., transmission and reception, of multiple protocol formats over a single byte stream. Using a WDM optical network as an example, an embodiment of the invention can be used to transport traffic payload, which can be supplied by one or more user sources using one or more protocol formats, in a single byte stream via a wavelength channel in the WDM optical network. To support this transport mode, a digital container having a unique frame structure is employed for transporting this heterogeneous payload comprising information formatted with multiple protocols. The digital container is a unit of information that is routed at the core transport network level.

As a generalized example using network 100 in FIG. 1, traffic supplied by user nodes 106–108 may be formatted according to different protocols, e.g., user node 106 may comprise an ATM switch, user node 107 may comprise an IP Router, and user node 108 may comprise a Frame Relay switch. This traffic from each of user nodes 106–108 would then be combined in digital containers at network node 105 for transport over the core transport network via the other network nodes. Because processing and routing of digital containers occurs at the network node level, a digital container according to the principles of the invention is therefore assembled or otherwise formed so that the payload contents only include traffic for user nodes serviced by the same network node.

Figure 2:
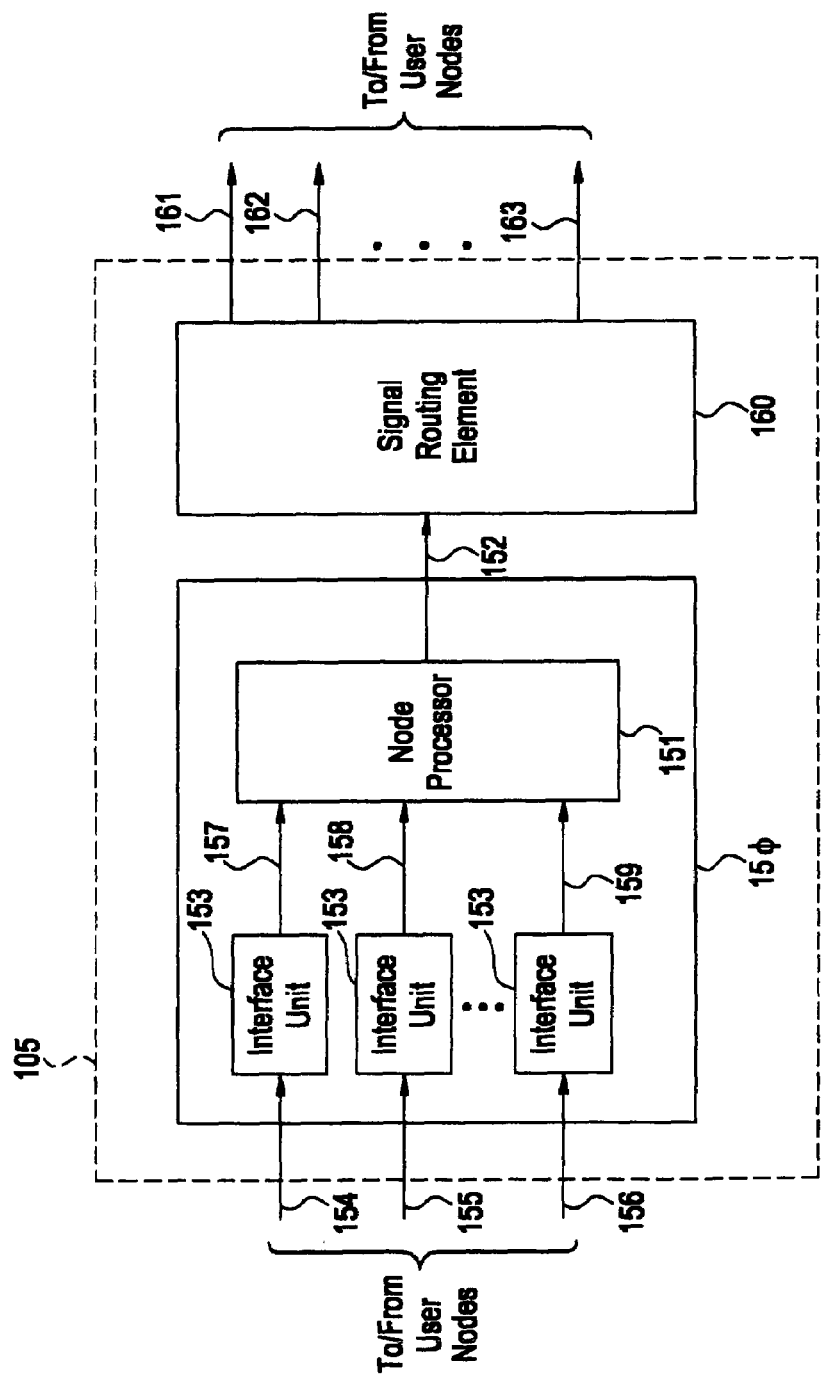
FIG. 2 shows an exemplary embodiment of a network node, as shown in FIG. 1, according to the principles of the invention.

FIG. 2 shows a simplified block diagram of a network node from FIG. 1 that may be used for carrying out the principles of the invention. More specifically, FIG. 2 shows network node 105 (from FIG. 1) having digital container processing circuitry 150 and signal routing element 160. Network node 105 may be coupled to one or more user nodes (shown here as connections 154–156) and one or more network nodes (shown here as connections 161–163). Although not explicitly shown, the connectivity to network node 105 can be two-way in that transmission may occur in either direction to/from user nodes or network nodes.

Digital container processing circuitry 150 is used for processing digital containers which may include, for example, functions such as assembling digital containers with input traffic supplied from one or more user nodes via connections 154–156 or extracting traffic or other information from digital containers and supplying same to user nodes via connections 154–156. In one embodiment, digital container processing circuitry 150 includes one or more interface units 153 and node processor 151. Interface units 153 are used to provide the interface between user nodes and network node 105. Node processor 151 is used for processing digital containers, which includes, but is not limited to, assembling and disassembling digital containers. Signal routing element 160 is used for routing digital containers, processed by node processor 151, to/from other network nodes via connections 161–163. In view of the following description on the format, function, and routing of digital containers, those skilled in the art will appreciate that digital container processing circuitry 150 and signal routing element 160 can be implemented using various well-known techniques and circuitry.

In operation, network node 105 may receive traffic from user nodes via connections 154–156. By way of example, user nodes coupled to network node 105 via connections 154–156 may be of the same or different type, e.g., ATM nodes, IP nodes, and so on. For this example, assume that each of the traffic streams via connections 154 and 155 is destined for user nodes serviced by the same destination network node while the traffic stream via connection 156 is destined for a user node serviced by a different destination network node. As such, the traffic supplied via connections 154 and 155 can be carried in the same digital container formed by node processor 151 while the traffic supplied via connection 156 would need to be assembled into a different digital container by node processor 151.

At network node 105, interface units 153 receive the traffic streams from each of connections 154–156. As such, interface units 153 will be capable of interfacing with the traffic type supplied via that connection. By way of example, connection 154 may be coupled to an IP network or node while connection 155 may be coupled to an ATM network or node. The output of interface units 153 will therefore depend on the type of traffic being supplied. Continuing with the above example, interface unit 153 coupled to connection 154 would therefore supply IP packets to node processor 151 via output 157 and interface unit 153 coupled to connection 155 would supply ATM cells to node processor 151 via output 158.

As will be described in more detail below, digital containers are formed at node processor 151. In the above example, at least one digital container would therefore be assembled based on the outputs supplied via connections 157 and 158 since both these traffic streams are destined for user nodes serviced by the same destination network node. Node processor 151 therefore is capable of identifying destinations based on the incoming traffic streams supplied via each of interface units 153. Moreover, node processor 151 is capable of determining appropriate destination routing of the incoming traffic streams so that digital containers can be assembled, e.g., determining incoming traffic streams destined for user nodes serviced by the same destination network node and then assembling one or more digital containers to carry these traffic streams. Once node processor 151 has received traffic from one or more interface units 153 which is destined for a common destination network node, one or more digital containers are assembled and supplied via connection 152 to signal routing element. In one embodiment for an optical transmission network, for example, signal routing element may include appropriate electrical-to-optical signal conversion capability as well as some form of routing capability. Using a WDM optical network example, the output of signal routing element 160 would be digital containers destined for other network nodes via one or more of outputs 161–163 which would be separate wavelength channels in a WDM system.

As will be described in further detail below, a digital container at the destination network node is processed so that traffic can then be separately routed to the appropriate user node. As such, a digital container according to the principles of the invention, while potentially carrying a heterogeneous payload comprising traffic from one or more users to one or more other users, is actually only associated with a single destination network node. A more detailed description of a specific embodiment of the invention in the context of network 100 (FIG. 1) is provided below.

This distributed processing approach has many advantages relating to speed, flexibility and scalability as compared to prior systems. In particular, processing of the digital container is simplified since it remains at the network node level in the core transport network. In prior systems, e.g., SONET, processing of payload occurs at the core transport level. Because the payload processing is a processor-intensive task, the overall speed and throughput of prior networks is therefore limited. By contrast, a network node according to the principles of the invention is not processing individual cells, packets and so on within the container and, therefore, greater throughput at the network nodes is realized which complements the high speed optical transmission in the core transport network. Moreover, processing of the payload within a digital container is simplified because the destination network node only has to know which user node to forward the information to. The equipment in the user node is then responsible, as before, for processing the traffic that is still in its existing format according to its protocol (e.g., ATM cells if an ATM switch). As such, the processing in the access networks remains the same as in legacy systems, thus avoiding costly and complex hardware and software modifications in these legacy systems.

Format and Function of Digital Containers

Figure 3A:
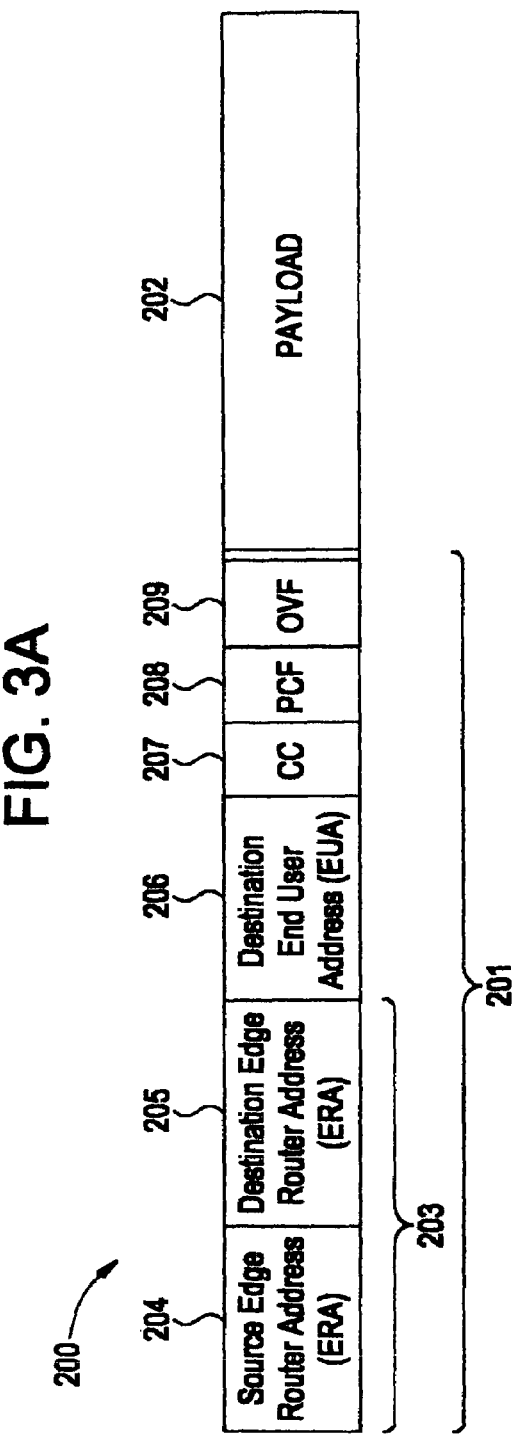
FIGS. 3A through 3D show various aspects of the frame format of a digital container according to the principles of the invention.

FIG. 3A shows the basic frame structure of a digital container according to the principles of the invention. More specifically, digital container 200 includes a header section 201 and a payload section 202. In one embodiment, digital container 200 is of fixed size. Header section 201 includes information used for processing at the container level, e.g., for routing containers among network nodes 105, 110, 115, and 120 (FIG. 1) within the core transport network. As will be described in further detail below, header section 201 also includes information helpful to processing the different traffic types within the payload section, e.g., to facilitate routing of different traffic to different user nodes after being received at the destination network node (i.e., edge network node) servicing those destination user nodes and equipment. Payload section 202 carries the heterogeneous payload comprising information formatted according to one or more protocols. One of the advantages of using digital container 200 in a transport scheme according to the principles of the invention is that the existing access equipment (e.g., ATM switches, IP routers, and so on) does not require modification since the format of the traffic is not changed, but instead is carried in its existing format within digital container 200.

As shown in FIG. 3A, header section 201 of digital container 200 includes an Optical Logical Channel Identification (OLCI) field 203 used for identifying the addresses of the source and destination network nodes for digital container 200. As shown, OLCI field 203 according to one illustrative embodiment of the invention includes a source edge router address (ERA) field 204 and a destination edge router address 205. Respectively, these addresses identify the source network node that assembled the digital container and the destination network node that is to receive and process the digital container. Destination end user address field (EUA) 206 is used to designate the destination address or identifier for the particular user within the access network (e.g., via interface units 153 in FIG. 2). The specific format for values populated in OLCI field 203 and EUA field 206 is a matter of design choice.

Header section 201 also includes a container counter field (CC) 207, a payload control field (PCF) 208 and an overflow field (OVF) 209. As will be described in further detail below, container counter 207 is used for processing partial units of information (e.g., packets that are split up among more than one digital container). Payload control field 208 is used for indicating the characteristics of the payload and, in particular, the number of units of traffic within the payload. The use of payload control field 208 will be described in further detail below with regard to specific illustrative embodiments of the invention.

Overflow field 209 is used for indicating whether a digital container includes complete or partial transmission of traffic units, e.g., packets, cells, etc. In one illustrative embodiment, three values are contemplated for overflow field 209 as follows (reference to packet is meant to refer to any units of information transmitted as traffic):

| | |
|---|---|
| OVF = 0 | For digital containers with PCF = 0 (e.g., signaling containers), PCF = 1 (e.g., dedicated container with free format payload) and PCF > 1 (shared container with multiple units of information (e.g., packets) but no partial packets). |
| OVF = 1 | When PCF = 1 and the digital container contains incomplete units of traffic (e.g., packets) along with other packets. |
| OVF = 2 | When PCF = 1 and the digital container contains the remaining portion of the incomplete unit of traffic. Note: If a unit of traffic exceeds the size of two digital containers, then the digital container containing the first portions of the unit of traffic sets PCF = 1 and OVF = 1, and the last container containing the remainder portion of the unit of traffic will have PCF = 1 and OVF = 2. |

Figure 3B:
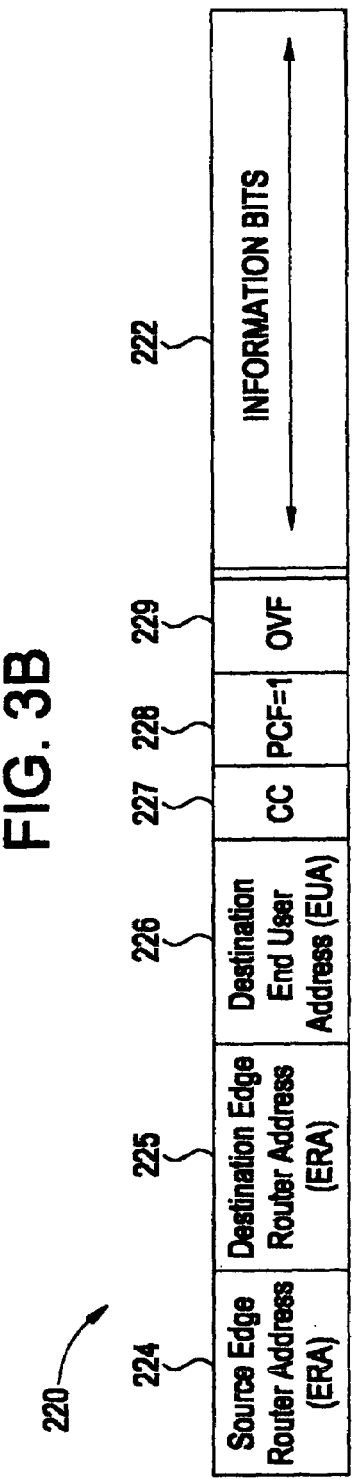
Figure 3C:
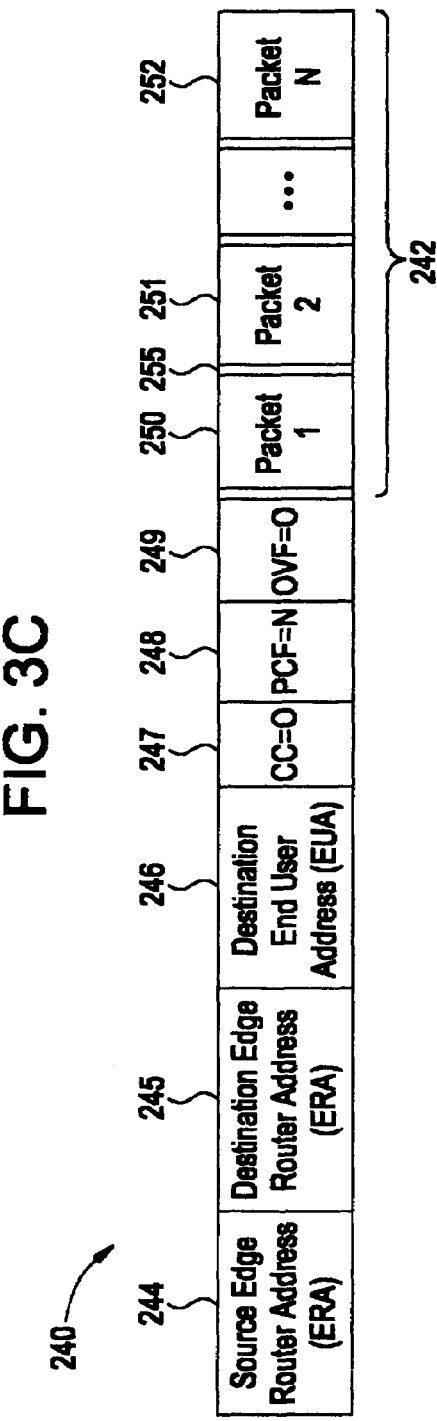
Figure 3D:
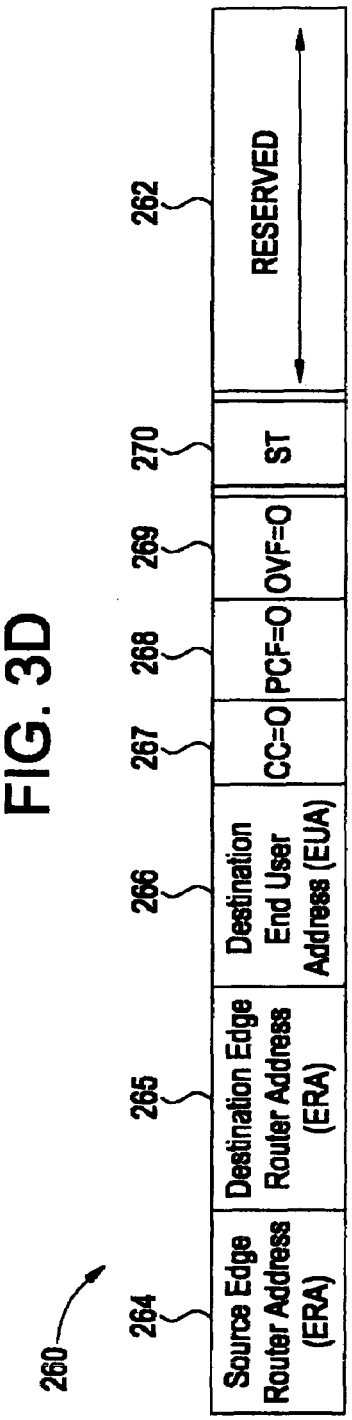

According to one illustrative embodiment of the invention, the digital container can be used for transporting traffic in three different modes. For example, a digital container can be used in a dedicated transport mode in which digital container only carries traffic for a single end user, in a shared transport mode in which the digital container carries traffic for two or more end users having a common destination network node, and in a signaling transport mode in which the contents of the digital container are applicable to all the end users serviced by a common destination network node. FIGS. 3B–3D show illustrative embodiments of these three types of digital containers according to the principles of the invention. More specifically, FIG. 3B shows a digital container for dedicated transport, FIG. 3C shows a digital container for shared transport, and FIG. 3D shows a digital container for signaling transport. For sake of brevity, only the differences between digital container 200 in FIG. 3A and those shown in FIGS. 3B–3D will be described in detail.

Digital container 220 shown in FIG. 3B can be used for a dedicated transport mode to a single end user. Payload section 222 in this case would be free format since no delineation functions are required within payload section 222, e.g., a single user receives the entire payload. By way of example, it is contemplated that this payload could include, but is not limited to, streaming video, real-time video, voice traffic, or any traffic type that remains in its native form (i.e., no other formatting is required to convert the traffic into another form such as packets and so on). Depending on the size of digital container 220 and the amount of payload, payload section 222 may include some unused portions. In one embodiment, digital containers having a fixed frame size of 125 microseconds are contemplated. A fixed frame size, along with fixed field sizes within header section (e.g., a fixed OLCI field), would facilitate other functions such as, by way of example, network synchronization and clock recovery when necessary.

It should also be noted that a digital container substantially of the form of digital container 220 in FIG. 3B can also be used according to another aspect of the invention to carry traffic consisting of "packetized" units of information that overflow one or more digital containers. In particular, the format of digital container 220 is well suited for transporting partial packets. The specific details associated with processing and binding traffic that is transported in multiple digital containers is covered below in the context of FIG. 5B.

Payload control field 228 of digital container 220 is set to a "1" indicating that payload section 222 carries one unit of traffic and which is dedicated to only one end user. In this example, overflow field 229 is set to "0" indicating that there is no overflow of payload, in the form of partial units of information, to another digital container. This is so because payload 222 is contemplated as being free format, e.g., a continuous bitstream, a continuous frame transmission, and so on. However, depending on the type of traffic being carried, more than one container may be used to carry the traffic from the source. As such, container counter field 227 may be optionally used to indicate how many digital containers include this traffic.

As previously described, destination ERA field 225 would include information about the destination or edge network node to facilitate routing of the digital container through the core transport network. Similarly, destination EUA field 226 includes information to facilitate the container delineation function at the edge network node so that traffic within payload section 222 can be routed to the appropriate destination. In particular, for the dedicated transport mode, destination EUA field 226 would be set to the address of the single end user.

Digital container 240 shown in FIG. 3C can be used for a shared transport mode to carry multiple units of heterogeneous traffic to one or more end users. In this type of digital container, payload control field 248 is set to "N", where N>1, to indicate that digital container 240 includes N units of traffic for one or more users. For example, payload section 242 may include N packets, shown here as packets 250–252, for a single user or N packets that are to be distributed among multiple users (serviced by the same network node of course). By way of example, well-known statistical multiplexing techniques can be used for processing the shared payload in payload section 242 among multiple users. Again, depending on the size of digital container 240, payload section 242 may include some unused portions.

Delineation between units of traffic, e.g., packets, in a digital container can be achieved using several different approaches. In the exemplary embodiment shown in FIG. 3C, a unique bit pattern 255 (e.g., such as '01111110' used as an HDLC flag) can be inserted between two consecutive packets for delineation.

Overflow field (OVF) 249 and container counter field (CC) 247 are set to a value of "0" to show that partial packets are not included in this container. The process of handling partial units of traffic (e.g., where a packet is larger than the remaining size of a digital container such that a portion of the packet would otherwise overflow to the next digital container) will be discussed in further detail below in the context of FIG. 5B.

Again, destination ERA field 245 would include information about the destination or edge network node to facilitate routing of digital container through the core transport network. Because the payload includes more than one unit of traffic for one or more users, the destination network node must therefore do some processing of payload 242 within digital container 240 in order to determine appropriate destination routing for the individual units of traffic. As such, destination EUA field 246 is used to trigger this processing. More specifically, EUA field 246 in digital container 240 would be set to "0" (or some other prescribed value). Upon receiving a digital container with such an EUA value, coupled with a payload control field=N value, the destination network node would therefore process the digital container to determine appropriate routing and/or forwarding for the units of traffic. This processing at the destination network node will be described in further detail below in FIG. 6.

FIG. 3D shows a frame format for digital container 260 used in a signaling transport mode. This type of digital container is identified by the payload control field 268 value. As shown, a payload control field 268 value of "0" indicates a signaling message frame. Because this is a signaling frame as opposed to a digital container with traffic payload, container counter field 267 and overflow field 269 are also set to "0". An additional field, signaling type (ST) field 270, is also provided to identify the message signaling type encapsulated in the digital container. As shown in FIG. 3D, payload section 262 is reserved for other uses depending on the signaling requirements, which will be described in further detail. The value of this field can be set according to a prescribed scheme depending on the type of signaling messages that are to be transported.

Again, destination ERA field 265 would include information about the destination or edge network node to facilitate routing of digital containers through the core transport network while destination EUA field 266 in the case of a signaling type digital container would have a value of "0" (or some other prescribed value) to show that the container is for signaling at the network node level. Other alternative embodiments are also contemplated by the teachings herein. For example, the destination ERA field 265 and destination EUA field 266 may have different values than those above when being used to establish wavelength connections between source and destination network nodes and so on. Some of these alternate embodiments are described in more detail below.

It should be noted that the use of digital containers according to the principles of the invention provides an important benefit in terms of supporting different signaling modes. For example, the aforementioned signaling capability provided through the use of digital container 260 in FIG. 3D is signaling at the network node level in the core transport network. As such, one would envision the use of such digital containers to establish wavelength channel connections between network nodes to set up a path for routing traffic-carrying digital containers.

According to another aspect of the invention, digital containers can support yet another type of signaling mode. For example, once a path is established from source to destination user, the signaling scheme in the user's network equipment can then be supported through the transport of digital containers. More specifically, digital containers having a format such as that shown in FIG. 3C can be used to support this form of signaling between user nodes. In this case, the N units of traffic within payload section 242 of digital container 240 (FIG. 3C) could be signaling messages used by each of the end users equipment according to the particular protocol. In one example, the user nodes may be switching nodes that use the well-known SS7 signaling scheme. In this case, individual units of traffic within the payload of the digital containers could be SS7 signaling messages for performing functions such as call set-up, call teardown, and so on.

Forming, Addressing and Processing Digital Containers

In general, digital containers are routed and processed as a function of the addressing information contained in the OLCI field. As described, digital containers are addressed at the network node level. That is, a digital container will only contain information destined for a user or users serviced by a single network node. For example, a digital container can be used for the transport of information multiplexed from many users serviced by a source network node over an available wavelength to one or more users serviced by a destination (or edge) network node. In the optical WDM domain, this aspect of the invention therefore facilitates on-demand bandwidth allocation. That is, particular wavelengths do not have to be dedicated resources, but rather can be allocated once a digital container is assembled and available for transmission between source and destination network nodes.

The processing of digital containers at the source and destination as well as the routing therebetween will now be described. Generally, a user node supplies units of traffic, e.g., packets, to a network node. After determining the intended destination for such traffic, the network node then determines the routing path for transporting the traffic. A digital container is assembled by the network node (e.g., a processor-based task) and the packet is included in the digital container.

The network node may also include other traffic in the same digital container provided such traffic is intended for users serviced by the same destination network node as the traffic being supplied by the first user node. Incoming traffic to the network node may be included in digital containers on a first come-first serve basis without regard to priority or may be included in digital containers based on precedence. In general, the particular implementation for combining the traffic into digital containers is a matter of design choice and can be achieved using well-known algorithms and techniques.

As previously described, delineation between units of traffic, e.g., packets, in a digital container can be achieved using several different approaches. As described in FIG. 3C, a network node can insert a unique bit pattern (e.g., such as a flag) between two consecutive packets for delineation. If a synchronous transport mode is desired, then digital containers can be sent by a network node based on a frame interval, such that digital containers will be released by the network node regardless of whether each has a full payload or not. For an optical network such as network 100 in FIG. 1, it is assumed that network nodes include appropriate optical transmission equipment for transmitting a digital container in optical form, e.g., electrical-to-optical conversion capability and so on. A digital container would then be transported over a particular wavelength channel of the system.

When the size of the unit of traffic, e.g., packet size, results in a packet not being able to completely reside within one digital container, the packet may be transported in two or more digital containers because of the overflow capability provided by digital containers. Responsibility for reassembling packets that have been partitioned remains with the destination network node and destination end user equipment.

As described, the actual implementation for loading units of traffic into digital containers is a matter of design choice. However, the type of traffic may, to a certain extent, dictate the type of payload format used for the digital container. For example, IP packets and ATM cells have similar characteristics and may be transported using similar payload formats, e.g., in dedicated or shared digital containers. Voice traffic from incoming TDM trunks can also be loaded onto a digital container as either a packet (after conversion at the source device, such as in the form of voice over IP, or voice over ATM, etc.) or directly as TDM voice samples. While the former case is handled as a regular packet (similar to an IP packet), the latter is handled in a digital container having a free format payload (e.g., PCF=1). Free format payloads may also be suitable for carrying DS1, DS3, and various SONET rate traffic as well.

FIG. 4 illustrates one exemplary process for forming digital containers at a source network node according to the principles of the invention. It is assumed for this example that the process of establishing connectivity between source and destination network nodes, e.g., wavelength connections and so on, has already occurred before the following assembly process is carried out at a source network node. The specific details concerning the establishment of paths between network nodes will be discussed further below.

As shown in FIG. 4, a unit of traffic is received at a network node from an end user in step 280. This network node will be referred hereinafter as the source network node. In step 281, the source network node then stores the unit of traffic in a buffer that is dedicated to the end user that is supplying the unit of traffic. Referring back to FIG. 2, the buffer may be associated with the individual interface units 153, for example, which service the incoming traffic from each of end users. The buffer is also linked to a digital container that is to be sent to a destination network node which services the destination end user. In step 282, the source network node determines whether the unit of traffic can be transmitted in a free-format payload format for a single destination end user. If so, the digital container is assembled in step 283 with that unit of traffic and the appropriate header information (e.g., PCF=1, OVF=0, and CC as applicable). If not, then the network node determines in step 284 whether there is sufficient space in the next digital container bound for the identified destination network node to accommodate the entire unit of traffic. If so, then the unit of traffic is included in this next digital container in step 285 along with appropriate header information (e.g., OVF=0, CC=0, and PCF according to the number of packets in the container).

If there is not sufficient space as determined in step 284, then the unit of traffic is included in a different digital container that contains no other units of traffic as shown in step 286. If the unit of traffic fits entirely within this digital container, as determined in step 287, then the digital container is assembled accordingly in step 288. If not, e.g., if the unit of traffic will overflow into one or more additional digital containers, as determined in step 287, then the overflow portions are included in subsequent digital containers having no other units of traffic included therewith as shown in step 289. In this latter case, the header information of the various digital containers carrying the traffic would be modified accordingly. For example, for the first and intermediate digital containers (i.e., all except the digital container having the last portion of the traffic), PCF=1, OVF=1 and the CC value is adjusted according to the respective digital container numbers (e.g., first container CC=1, second CC=2, and so on). The last digital container carrying the partitioned traffic would have PCF=1, OVF=2, and CC=N where N is the number of the last digital container.

Figure 5A:
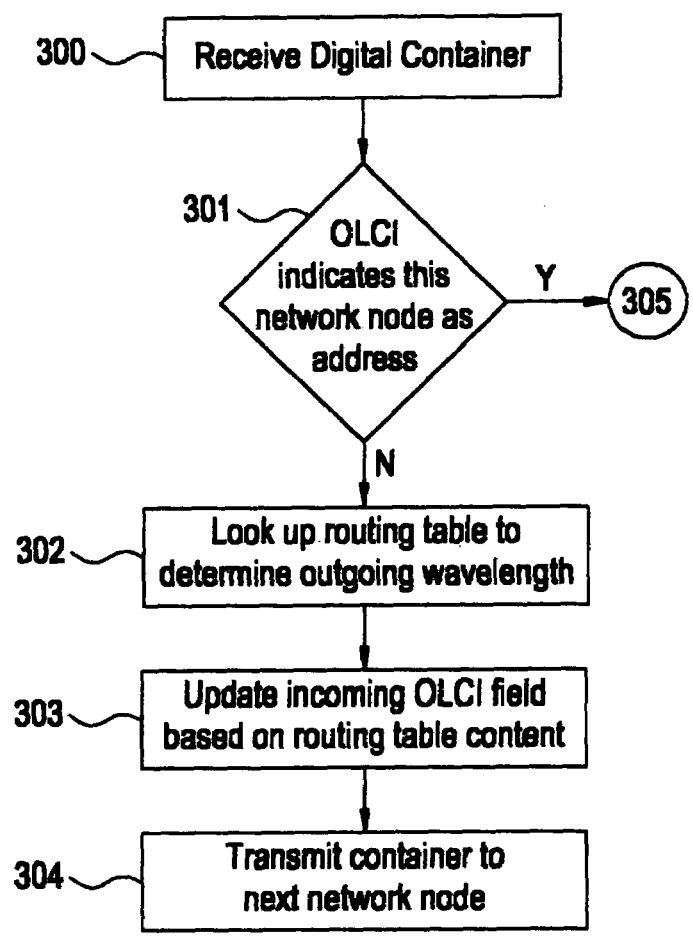
FIGS. 5A and 5B are simplified flow diagrams that illustrate the handling and processing of digital containers at intermediate and destination network nodes according to the principles of the invention.
Figure 5B:
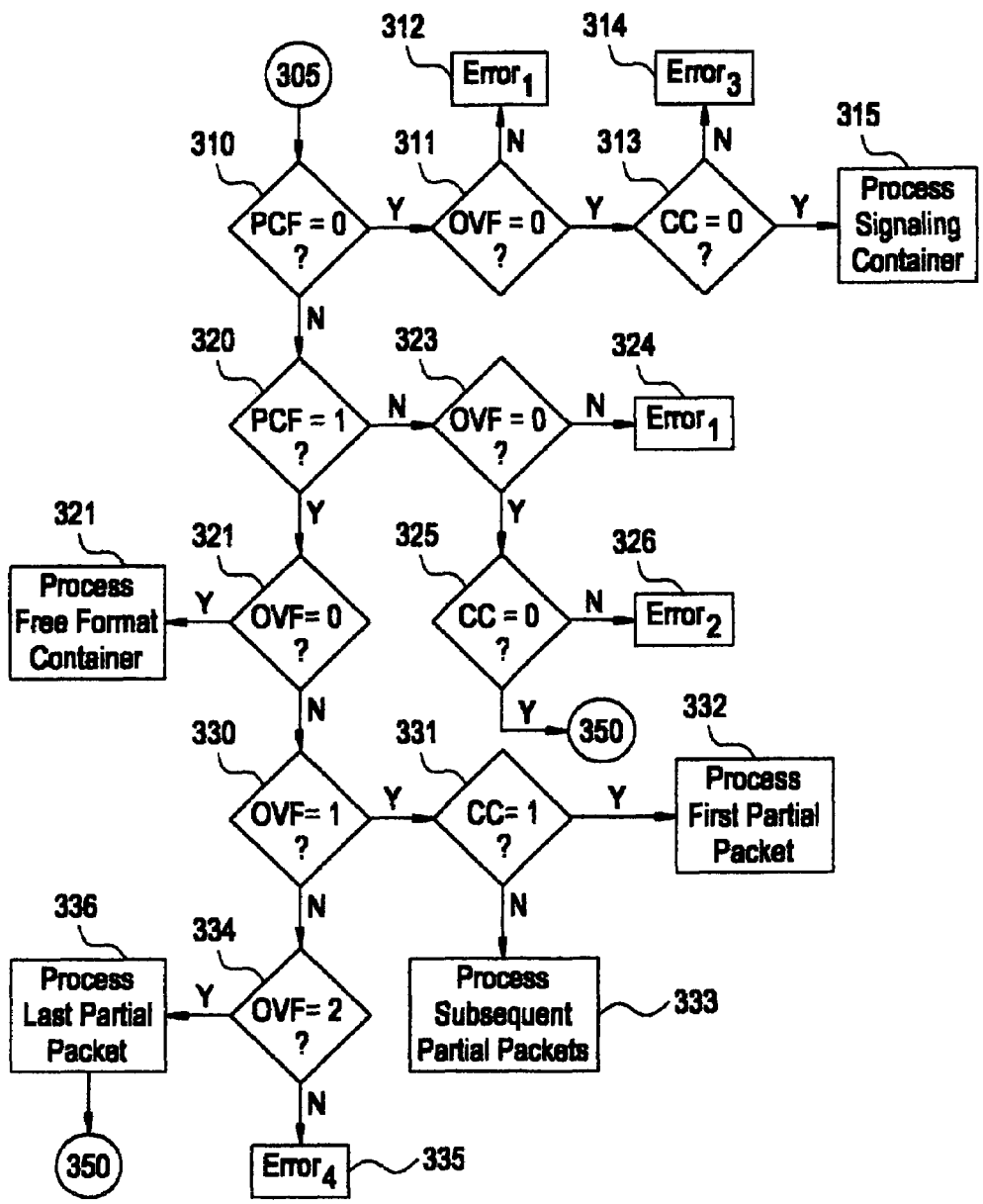

FIGS. 5A and 5B show, in simplified flowchart form, an exemplary embodiment for routing digital containers according to the principles of the invention. For a more complete understanding of the invention, the routing process illustrated in FIGS. 5A and 5B will refer to various aspects of network 100 (FIG. 1) as well as to the frame structure of the different digital containers FIGS. 3A–3D. Assume for this example, that network node 105 has collected traffic generated from one or more user nodes 106–108 which is intended for user nodes 111–113 serviced by network node 110. Different scenarios will be presented within this example. Because network 100 is a WDM-based optical network, it is assumed that network nodes 105, 110, 115, and 120 include the appropriate capability for optical-to-electrical and electrical-to-optical signal conversions and processing.

As previously described, network node 105 assembles a digital container having a format substantially as shown in FIG. 3A. Upon receipt of a digital container sent by network node 105 (step 300), subsequent network nodes check the applicable OLCI field in step 301 (e.g., destination ERA field 205 in FIG. 3A) to determine the appropriate destination network node. If the network node receiving the digital container determines that it is not the destination network node, then this network node checks a routing table in step 302 to determine the outgoing wavelength channel that corresponds to the destination network node. If necessary, the OLCI fields of the digital container are updated in step 303 based on the information retrieved from the routing table. Use of routing tables will be described below in further detail. This intermediate network node then transmits the digital container to the next network node as indicated by step 304.

If the network node receiving the digital container determines that it is the destination network node, then this destination network node proceeds through the steps shown in FIG. 5B as indicated by connector 305 to determine the appropriate processing for the received digital container. As shown in step 310 in FIG. 5B, the payload control field is checked first. If PCF=0, then the overflow field (OVF) is checked to see if the value is "0" as shown in step 311. If not, then appropriate error notification and/or remedies can be employed in step 312 since the overflow field (OVF) is expected to be "0" when PCF=0. One such remedy may be retransmission, for example. If OVF=0, then the container counter field (CC) is checked in step 313 to see if that value is "0". If not, then appropriate error notification and/or remedies can be employed in step 314 since the container counter field (CC) is expected to be "0". If CC=0 then the digital container is forwarded for processing as a signaling container as shown in step 315.

In step 310, if the payload control field (PCF) is not equal to "0", then the network node checks whether "PCF=1" in step 320 which would indicate that the digital container is either a dedicated container, e.g., for a single user or network serviced by the network node, or a container having partial packets. If the payload control field (PCF) is not equal to "1", which would indicate that the digital container includes multiple units of information for one or more users, then the overflow field (OVF) is checked to see if its value is "0" as shown in step 323. If not, then appropriate error notification and/or remedies as described above can be employed in step 324 since the overflow field (OVF) is expected to be "0" when the payload control field (PCF) is not equal to "1". If OVF=0 in step 323, then the container counter field (CC) is checked to see if its value is a "0" in step 325. If not, then appropriate error notification and/or remedies as described above can be employed in step 326 since the container counter field (CC) is expected to be "0" when OVF=0. If CC=0 in step 325, then delineation of the multiple units of information within the payload continues with the process shown in FIG. 6 (as indicated by connector 350).

If PCF=1 in step 320, then the overflow field (OVF) is checked in step 321. If OVF=0, then the digital container carries a free format payload for a dedicated end user which is forwarded as shown in step 322. As previously indicated, this type of payload is typically not processed in the destination network node, but rather is extracted from the digital container and forwarded in its present native form to the end user where processing then occurs.

If the overflow field (OVF) is not equal to "0" in step 321, then a check is made as to whether OVF=1 in step 330, thus indicating the presence of partial units of information, e.g., partial packets. If so, then the container counter (CC) field is then checked in step 331. If CC=1 then the digital container is the first digital container that includes the first part of a partial unit of information, e.g., packet, and the first packet is then stored for processing as shown in step 332. When the container counter field (CC) is not equal to "1" in step 331, then the digital container includes subsequent parts of the packet which are then stored for processing as shown in step 333. As previously described, it is contemplated that a unit of information, such as a packet, may not fit within a single digital container. As such, multiple digital containers would be used to carry this payload and the container counter field (CC) is used to indicate the sequencing of the containers having this payload. For example, a digital container with CC=1 is the first digital container, CC=2 is the second digital container, and so on until CC=N where N is the last container carrying the partitioned payload. To facilitate the identification of this last digital container (CC=N), the overflow field (OVF) is set to a value of "2". When OVF=2, as determined in step 334, then the last packet is then processed in step 336 and, along with the other stored parts of the packet from steps 332 and 333, the entire packet is then forwarded (step 350) for processing according to the steps shown in FIG. 6. If the overflow field (OVF) is not equal to "2", then appropriate error notification and/or remedies as described above can be employed in step 335 since the overflow field (OVF) is expected to have the values "0", "1", or "2" in this illustrative embodiment.

In another embodiment, it is contemplated that the packet, once collected by the destination network node from the multiple digital containers, can be directly forwarded to the appropriate end user based on the end user address information contained within the headers of the digital containers carrying the various parts of the packet.

Figure 6:
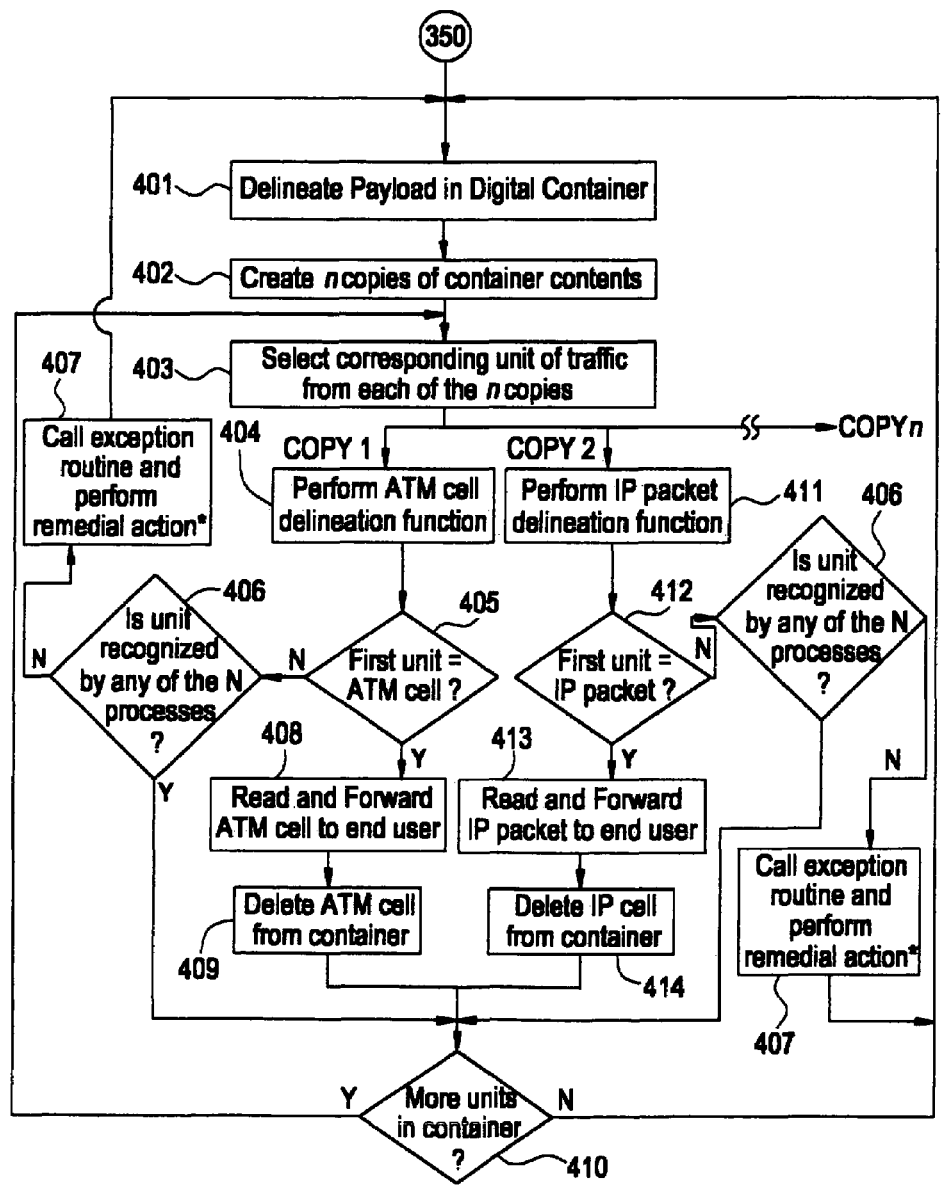
FIG. 6 is a simplified flow diagram of the process for delineating payload in digital containers at a destination network node according to the principles of the invention.

For the cases when the digital container includes more than one unit of information in the payload, i.e., PCF>1 (steps 323–326, 350), the destination network node must then perform some processing to delineate the units of information within the payload portion of the digital container since the traffic may be in different formats and for multiple users. In one example, this heterogeneous mix may comprise different types of traffic (e.g., IP, ATM, etc.) for different users or access networks. Another example might be the same type of traffic (e.g., ATM) but for different users or ATM access networks coupled to the same network node. As such, delineation is necessary so that the payload within the digital container can be efficiently routed to the appropriate end user destinations. To facilitate this delineation, so-called boundaries between the various units of traffic within the payload of a digital container can be used, e.g., to recognize separate ATM cells, IP packets, and so on. However, actual processing of the individual units of traffic still remains a user (or access network) responsibility once forwarded by the network node to the user or access network. FIG. 6 illustrates one such embodiment for delineating units of information within a digital container before forwarding to intended destination users.

As shown in FIG. 6, a digital container is received at a destination network node in step 350 from the earlier described processing. In step 401, delineation occurs as a function of identifying the boundaries between separate units of traffic. As described, the source network node, as part of its algorithm for combining units of traffic in the payload section of the digital container, may insert a unique digital marker or "boundary flag" between each unit of traffic in the payload section. By way of example, this unique marker may be a byte, e.g., "01111110". When the destination network node identifies the boundary flag, it is assumed to be a boundary between two units of traffic (e.g., between two packets, cells, and so on). Those skilled in the art will recognize that there are other suitable alternatives for "boundaries" that can be used to delineate payload. For example, boundary recognition may be a function of reading/identifying the OLCI field as a start of a new unit of traffic. Alternately, a fixed container size might also provide a means for delineating boundaries between units of traffic. As such, the embodiment shown and described herein is meant to be illustrative and not limiting in any way.

In step 402, n copies of the payload contents are created and passed to step 403 where each corresponding unit of traffic (e.g., packet, cell, etc.) is selected from each of the n copies. The first copy (copy 1) of the selected unit of traffic is passed to a first sub-process, the second copy (copy 2) of the same unit of traffic is passed to a second sub-process, and so on until the nth copy (copy N) of the same unit of traffic is passed to the nth sub-process. It should be noted that n represents the number of different protocols that may be supported by the various access networks and users connected to the core transport network. For purposes of this illustrative example, it is assumed that the first sub-process corresponds to a well-known ATM-based access network and the second sub-process corresponds to a well-known IP-based access network. However, those skilled in the art will recognize that other protocol formats can also be used in conjunction with the principles of the invention, e.g., SONET frames contained in a bucket, packets from wireless end points, TDM samples, and so on.

As shown, the first copy of the first unit of traffic selected in step 403 is passed to step 404 where well-known ATM cell delineations functions are carried out to determine whether the first unit of traffic is an ATM cell. For example, step 404 may include making an assumption that the unit of traffic is an ATM cell and performing ATM cell delineation (using well-known techniques) based on what would typically be expected in the ATM cell header information. For example, this may comprise determining a CRC check on the ATM cell header contents and comparing it with the CRC field contained in the ATM cell header. If the first unit of traffic is not deemed to be an ATM cell, then a check is made in step 406 to determine whether that unit of traffic was recognized by any of the n sub-processes. Although this step is simplified in the flowchart, it will be apparent to those skilled in the art that such a check must involve some decision or decisions based on the results of each of the similar steps in the other sub-processes. As such, appropriate delays and buffering may be required to accommodate such a check.

If the unit of traffic is not recognized by any of the n sub-processes, then an exception routine would be called out and executed by the network node in step 407 to perform, for example, appropriate remedial action. By way of example, if a unit of traffic is not recognized by any of the n sub-processes, then two possibilities can be examined. First, it could be the case that there is a unit of traffic associated with a protocol not recognized by the destination network node. Another possibility is that some units of traffic may have been corrupted during transmission and/or processing. Remedial actions may include, but are not limited to, requesting retransmission of the entire digital container or portions thereof or discarding the entire digital container (dump mode). The particular implementation is left to the system and network designers.

If step 406 determines that the first unit of traffic was recognized by one of the n sub-processes, then the process proceeds to step 410 which checks to see if there are additional units of traffic in the digital container. If so, then the process repeats starting at step 403. If not, then the process awaits the receipt of the next digital container (step 400). If the first unit of traffic is identified as an ATM cell, the network node reads and forwards the ATM cell in step 408 to the appropriate user (or ATM access network). For example, this forwarding may be accomplished by using the VPI/VCI fields in the ATM cell header. After the ATM cell is forwarded to the appropriate end user, the ATM cell is deleted in step 409 from the digital container. Normal processing (e.g., hardware and software aspects) of the ATM cell is then the responsibility of the end user or access network to which it was routed, e.g., segmentation and reassembly, cell ordering, and so on. The process then proceeds to step 410 to determine whether additional units of information are present as previously described.

Similar steps occur for each of the other sub-processes. For example, the second sub-process (copy 2) includes similar steps for an IP-based network and will not be described in detail for sake of brevity. In particular, steps 411–414 are similar to steps 404–409 of the first sub-process (copy 1) except for the type of unit of traffic (e.g., IP packet versus ATM cell) and the processing thereof. However, those skilled in the art will understand the differences in terms of using IP packet header information instead of ATM cell header information for delineating and determining whether the unit of traffic is an IP packet. Furthermore, those skilled in the art are familiar with the type of header information in the IP packet that can be used to determine the end user destination for routing the IP packet and so on.

Routing of Digital Containers

Routing of digital containers occurs as a function of the addressing information. When intermediate network nodes are involved in the transport of a digital container between source and destination, routing tables are used to facilitate the routing process. For example, a network node employs a lookup table to determine whether the incoming digital container, based on the OLCI addressing, is destined for that network node and users serviced therefrom, or whether the digital container needs to be further routed by this intermediate network node to another network node. If the former, then the network node performs some high level processing of the digital container, as will be described below in more detail, to extract and forward the payload to one or more end users serviced by that network node. The traffic in the payload (e.g., packets, cells, etc.) is then locally processed in the end users' equipment or network according to prescribed protocols dictated by the end users' equipment or networks. If the latter, the network node forwards the entire digital container to the next network node according to the routing table. Thus, the payload of the digital container is not read or modified at intermediate network nodes, thus reducing processing at the core network level.

FIG. 7 illustrates two examples of tables that can be maintained in the network nodes to facilitate the routing process. Table 1 is a routing table that identifies the following fields: incoming OLCI 501; incoming wavelength 502 (e.g. if WDM); destination network node 503; outgoing wavelength 504 (e.g., if WDM); and outgoing OLCI 505 (if OLCI is changed as will be described below). A network node, upon receipt of a digital container, will perform a look-up in its routing table to identify whether the digital container, based on the OLCI), either: 1) terminates at this network node (e.g., as in the case shown by the second entry where outgoing information is not populated); or 2) is to be routed to another network node via the outgoing wavelength indicated in the routing table. Table 2 is a user activation table that can be maintained in each of the network nodes that indicates which network nodes service which user nodes. In this exemplary embodiment, Table 2 includes and end user field 551, a network node field 552, and an "active/inactive" field 553, which can be used, for example, to establish whether the user node has been activated, e.g., can send and receive traffic. It should be noted that these tables are meant to be illustrative and not limiting in any way.

According to another aspect of the invention, routing of digital containers through intermediate nodes can be implemented in several different ways, each of which involves a different distribution of the processing activities among the network nodes. The amount of processing at a particular intermediate network node is determined, in part, by whether the intermediate node accesses the header information of a digital container to modify the contents.

In one embodiment, for example, the source network node can place the destination network node's address in the destination ERA field 205 (FIG. 3A). In this case, an intermediate network node will check its routing tables (e.g., Tables 1 and 2 in FIG. 7) and, upon determining that the digital container is addressed to a different network node and users, will forward the digital container according to the entries set up in its routing table. Because destination ERA field 205 contains the destination network node's address, there is no need for the intermediate network node to modify this address field.

In another exemplary embodiment, a source network node may place only the next network node's address in destination ERA field 205 (FIG. 3A), e.g., node by node routing.

After receiving the digital container, an intermediate network node would then check its routing tables (e.g., Tables 1 and 2 in FIG. 7) to determine which node services the intended user. The intermediate network node in this case will then update the destination ERA field to indicate the next network node's address. Accordingly, the first approach requires less processing at the intermediate network nodes and may be preferred for certain applications and services. The above examples were only meant to be illustrative since the particular method can be a matter of design choice. As such, other methods will be apparent to those skilled in the art and are contemplated by the teachings herein.

According to another aspect of the invention, digital containers can be used for purposes other than carrying payload for end user processing. For example, when no data is available from an end user, or when there is no data to transmit on a particular wavelength, "empty" containers with a universal OLCI can be transmitted to maintain transmission synchronization between connected network nodes. Digital containers can also be used for transporting maintenance, operations, and performance monitoring information.

According to yet another aspect of the invention, a transport scheme based on digital containers can be used to facilitate on-demand routing at the core transport network level. In particular, signaling-type digital containers are used to facilitate the set up of an optical logical channel (OLC) between a source and destination network node. This aspect of the invention allows for flexibility in terms of managing bandwidth, that is, digital containers can be routed across different wavelength channels depending on required bandwidth, availability, and so on.

More specifically, in response to a connection request from an end user, the source network node checks whether a wavelength channel to the destination network node exists and whether there is sufficient capacity on that wavelength channel to support the request. If a wavelength channel with sufficient capacity to the destination network node is already established, that same connection will be used for the transport of the new traffic. Moreover, if digital containers being routed to the destination network node, then the source network node will include the new traffic in these digital containers.

If unavailable, then the source network node commences the process for requesting a connection to the destination network node. More specifically, signaling-type digital containers are used to facilitate this process. As previously described, a signaling-type digital container (shown in FIG. 3D) includes a signaling type (ST) field 270. In one exemplary embodiment, ST field 270 can be used as follows:

| ST Field | Signaling Command/Message |
|---|---|
| 1 | OLC Setup Request (OLCSR) |
| 2 | OLC Request Forward (OLCRF) |
| 3 | OLC Request Response (OLCRR) |
| 4 | OLC Disconnect Request (OLCDR) |
| 5 | OLC Disconnect Request Response (OLCDRR) |
| 6 | Acknowledgement to OLCSR (AOLCSR) |
| 7 | Negative Acknowledgement to OLCSR (NOLCSR) |

-continued

| ST Field | Signaling Command/Message |
|---|---|
| 8 | Discovery Bucket (DB) |
| 9 | Discovery Bucket Response (DBR) |

For simplicity of explanation, the use of the above signaling type (ST) fields will be described in the context of the frame format shown for the digital container in FIG. 3D except where indicated otherwise. A digital container including ST=1 (OLCSR) is sent by the source network node to request establishment of an optical logical channel (OLC) for sessions for one or more end users at a destination network node. In one illustrative embodiment, the destination ERA field 265 (FIG. 3D) is set to the next network node to which the source network node is connected via a wavelength channel. Destination EUA field 266 remains fixed and contains the address for the destination network node. This is in contrast to payload-carrying digital containers in which the EUA field is set to the end user address. When the next network node receives an OLCSR, it looks for available bandwidth and for the next intermediate or destination network node to send the OLCSR.

When found, this intermediate network node then creates a digital container with ST=2 (OLCRF) and adds the address of the found network node to its routing table (e.g., such as the one shown in Table 1 of FIG. 7). The address of the found network node (i.e., next network node) is then added to the destination ERA field 265 in the OLCRF digital container. Destination EUA field 266 remains the same, i.e., includes the address of the destination network node as indicated in the original OLCSR request. The OLCRF digital container is then forwarded to the next network node and the process continues until the destination network node is reached.

As the process continues and digital containers with ST=1 (OLCSR) are being sent through the network, the various network nodes provide acknowledgements or negative acknowledgements as to whether the request will be acted upon. For example, upon receiving an OLCSR message, a network node sends a response to the originating network node by either: 1) acknowledging that the request has been received and will be acted upon, e.g., digital container with ST=6 (AOLCSR); or 2) by sending a negative acknowledgement, e.g., digital container with ST=7 (NOLCSR), indicating that the request will not be acted upon. The reasons for not acting on a request may be related to processing resource issues at the node or other reasons.

Once the digital container arrives at its destination network node (i.e., when destination ERA field 265 is the same as the address of the destination network node), a digital container with ST=3 (OLCRR) is sent back to the source network node using the same set of concatenated wavelength channels over which the original OLCSR digital container was received. The OLCRR message would therefore include information relating to the actual wavelength assignments, connections, and so on (i.e., path set up information). The OLCRR message can also be used to convey information as to why a connection cannot be established as requested, e.g., unavailability of bandwidth.

Similarly, each of the intermediate network nodes may also respond to the originating network node with an OLCRR message (digital container having ST=3) indicating the wavelength connections and so on for the path up to and including that intermediate router, thus providing cumulative information on the path routing back to the source network node.

All network nodes maintain a listing of end users serviced by the various network nodes so that, when a request for connection for a specific end user arrives, the network node can determine to which network node it should forward the OLCSR digital container. As described, this listing may be of the form shown in Table 2 in FIG. 7. Once the optical logical channel (OLC) is established between source and destination network nodes, then digital containers carrying payload associated with the end user connection request can be sent as described earlier.

The above process of wavelength establishment applies equally to both connection oriented as well as connectionless sessions between end users. Signaling between end user nodes occurs after an optical path has been established between network nodes associated with the end user nodes.

Once the optical logical channel (OLC) is no longer needed, a signaling-type digital container having ST=4 (OLCDR) is sent to request disconnection of the OLC. Either the source or destination network node can determine that the connection is no longer needed and send the request for disconnection. When such a request arrives, a digital container having ST=5 (OLCDRR) is sent as an indication that the request has been granted. As intermediate network nodes receive the OLCDRR digital container, these intermediate nodes remove the OLC connection from their routing tables.

Figure 8:
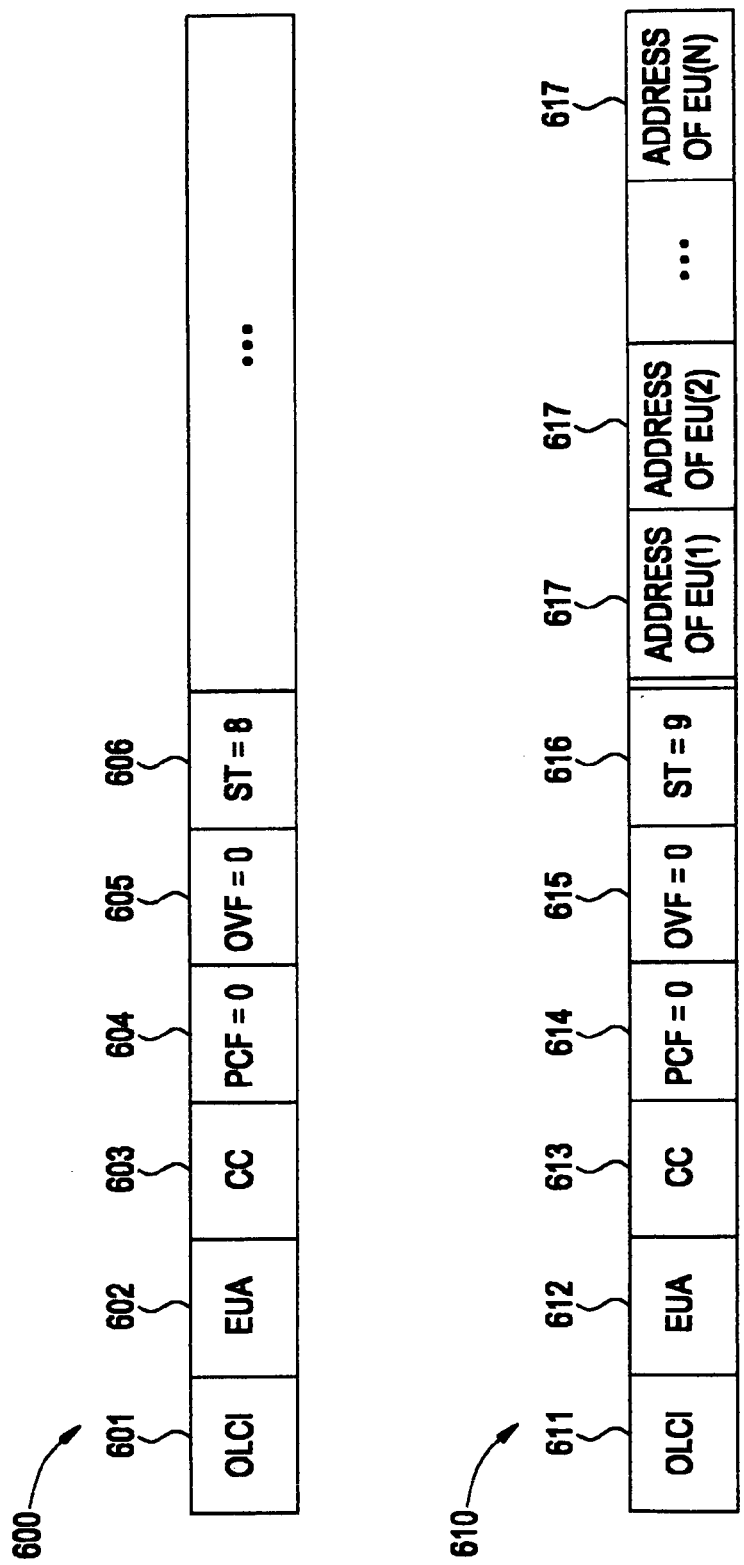
FIG. 8 shows exemplary frame formats of a digital container used for a signaling function according to the principles of the invention.

According to another aspect of the invention, discovery buckets (DB) can be sent to search out end users connected to network nodes. More specifically, digital containers having ST=8 (DB) are sent to the particular network node for which the originating network node wishes to gather end user addresses, such as IP addresses of IP-based end users. FIG. 8 shows digital container 600 as one example of how discovery buckets can be formatted. Destination ERA field (not shown) in OLCI 601 includes the address for the particular network node to be queried. Of course, the source ERA field (not shown) in OLCI 601 includes the address of the originating network node. In response, the particular network node then sends a response to the originating network node including all end user addresses connected to it. The response is in the form of a digital container 610 with ST=9 (DBR). Again, the source and destination ERA fields in OLCI 611 are used for identification purposes. Subsequent fields of digital container 610 can be used to include the end user addresses 617 in a prescribed format, such as that shown in FIG. 8.

Figure 9:
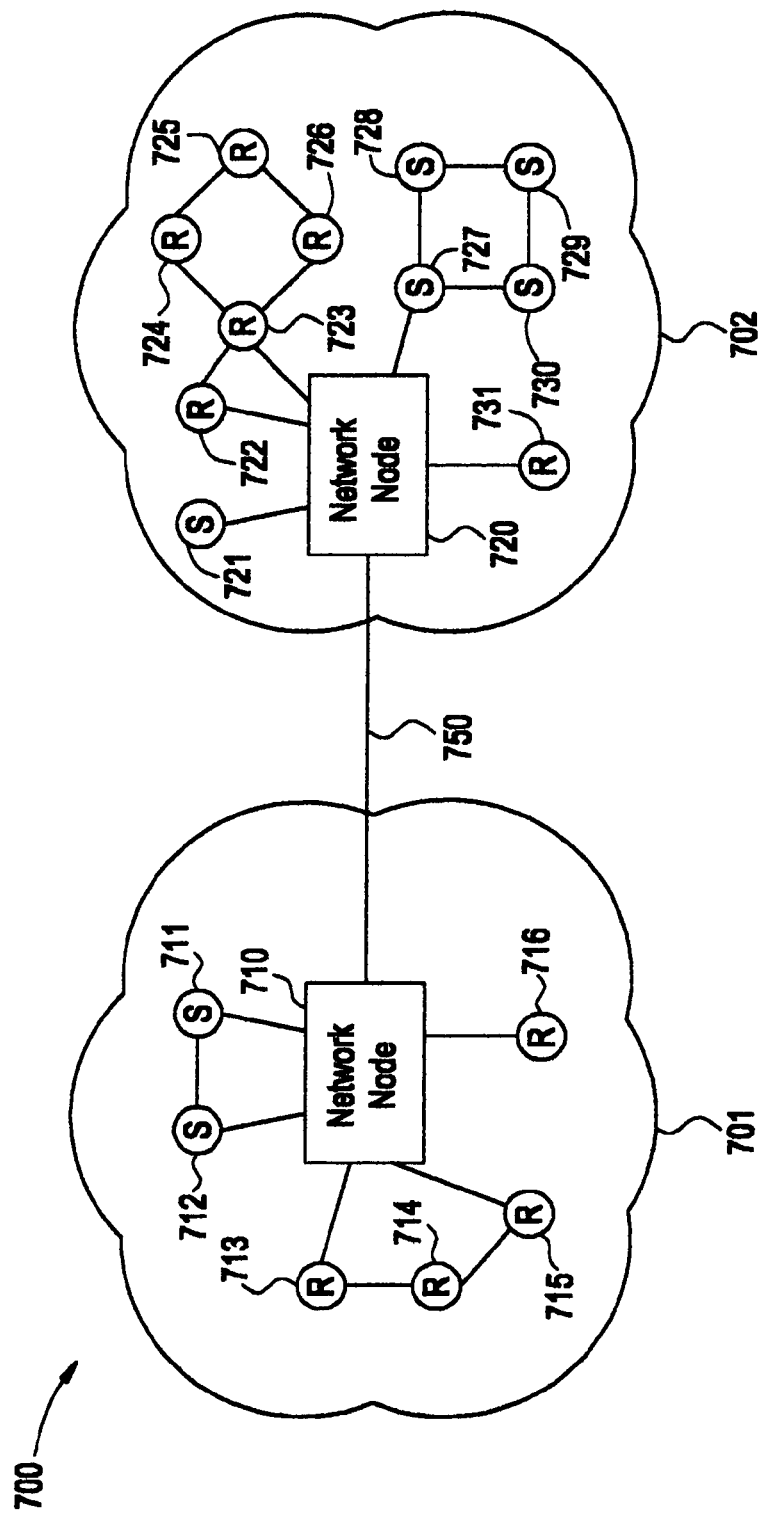
FIG. 9 shows an exemplary heterogeneous network in which the principles of the invention can be utilized.

According to another aspect of the invention, heterogeneous systems can be internetworked in a more simplified and less costly manner by using digital containers to transport information. FIG. 9 shows a simplified network 700 including regions 701 and 702 having respective networks and sub-networks. Regions may be physically or logically distinct networks and may be based on geographic or physical considerations (cities, businesses, etc.), topological considerations (e.g., metropolitan area networks (MANs), local area networks (LANs), wide area networks (WANs), etc.), network architectural and operational considerations (e.g., traffic patterns, capacity, etc.), and so on. For this example, regions 701 and 702 are presumed to be separate networks. Each region may support different sub-networks such as router-based networks (e.g., routers 713–716 in region 701 and routers 722–726, 731 in region 702), switch-based networks (e.g., switches 711–712 in region 701 and switches 721, 727–730 in region 702), and so on. As such, multiple traffic types may be supported within each of regions 701 and 702, e.g., packet-based traffic, ATM cell-based traffic, and so on.

By using digital containers to transport heterogeneous traffic, inter-regional transport can be supported in a very simplified and low cost manner. More specifically, region 701 includes network node 710 and region 702 includes network node 720, both of which are capable of processing digital containers according to the principles of the invention as previously described. Network nodes 710 and 720 are used to format traffic supplied from the various nodes, networks, sub-networks and so on within the respective regions into digital containers, transport the digital containers between regions 701 and 702 on inter-regional link 750, and process and route traffic from these containers to the intended nodes, networks and sub-networks within each region. So, traffic transport within a region may still occur as it was done before (e.g., according to legacy systems) while traffic transport between regions can occur by using digital containers according to the principles of the invention.

Accordingly, traffic transport on an inter-regional basis can be accomplished in a way that facilitates better use of bandwidth, capacity, resources, and so on. This solution is also less costly since every node within each of the regions does not have to be necessarily equipped to process digital containers. As mentioned, legacy systems can still be used within the different regions. Moreover, inter-regional links, such as link 750, are typically more costly than the intra-regional links within regions 701 and 702. The use of digital containers for inter-regional transport can reduce the inter-regional connectivity that might otherwise be required to support the transport of traffic between regions 701 and 702 and therefore reduce the cost of transporting inter-regional traffic.

Numerous modifications and alternative embodiments of the invention will be apparent to those skilled in the art in view of the foregoing description. Accordingly, the description is to be construed as illustrative only and is for the purpose of teaching those skilled in the art the best mode of carrying out the invention and is not intended to illustrate all possible forms thereof. It is also understood that the words used are words of description rather than limitation, and that details of the structure may be varied substantially without departing from the spirit of the invention. The exclusive use of all modifications that come within the scope of the appended claims are hereby reserved.

What is claimed is:

1. A method of transporting information in an optical communication network having interconnected network nodes and one or more user nodes coupled to network nodes, the method comprising:

forming a digital container at a first network node, the digital container including a header section and a payload section, wherein the payload section carries a plurality of separate transmissions, each transmission formatted according to one of many different protocols;

routing the digital container through the communication network based on a channel identification field contained within the header section of the digital container that identifies the destination of the digital container;

receiving and processing the digital container at a second network node; and routing the separate transmissions carried in the payload section of the digital container to one or more user nodes serviced by the second network node without the digital container, wherein the payload section of the digital container includes transmissions for only the one or more user nodes serviced by the second network node.

2. The method according to claim 1, further comprising the step of processing the separate transmissions according to the one or more protocols at the one or more user nodes.

3. The method according to claim 1, wherein the payload section of the digital container comprises a heterogeneous payload having a plurality of units of traffic selected from the group consisting of an Asynchronous Transfer Mode (ATM) cell, an Internet Protocol (IP) packet, a streaming video bitstream, a real-time video bitstream, voice traffic stream, a Time Division Multiplex (TDM) sample, a SONET frame, a DS–n signal, where n is an integer, and signaling messages according to a prescribed signaling scheme.

4. The method according to claim 1, wherein the digital container is formed as a signaling-type container for establishing a communications connection between network nodes.

5. The method according to claim 1, wherein the digital container is formed as a signaling-type container for establishing a communications connection between user nodes.

6. The method according to claim 1, wherein the step of forming comprises forming a digital container of a fixed size.

7. The method according to claim 1, wherein the channel identification field comprises an optical logical channel identification (OCLI) field for identifying the destination of the digital container.

8. The method according to claim 7, wherein the OCLI field comprises a network node destination address and one or more user node destination addresses, wherein the network node destination address corresponds to the second network node and wherein the one or more user node destination addresses correspond to one or more user nodes serviced by the second network node.

9. The method according to claim 7, wherein the step of routing the digital container comprises routing the digital container based on the destination identified in the OCLI field.

10. The method according to claim 1, wherein the header section further includes a payload control field for indicating whether contents of the payload section of the digital container are dedicated to a single user node.

11. The method according to claim 1, wherein the header section further includes a payload control field for indicating whether contents of the payload section of the digital container are intended for two or more user nodes serviced by the same network node.

12. A method of transporting information in an optical communication network having interconnected network nodes and one or more user nodes coupled to network nodes, the method comprising:

forming a digital container at a first network node, the digital container including a header section and a payload section, wherein the payload section carries a plurality of separate transmissions, each transmission formatted according to one of many different protocols; and addressing the digital container for routing to a second network node such that routing of the digital container through the communication network is based on a channel identification field contained within the header section of the digital container, wherein the digital container is not routed to a user node and the payload section of the digital container includes transmissions for only the one or more user nodes serviced by the second network node.

13. A method of transporting information in an optical communication network having interconnected network nodes and one or more user nodes coupled to network nodes, the method comprising:
   receiving, at a second network node, a digital container transmitted by a first network node using a channel identification field corresponding to the digital container, the digital container including a header section and a payload section, wherein the payload section carries a plurality of separate transmissions, each transmission formatted according to one of many different protocols;
   processing the digital container at the second network node; and
   routing the separate transmissions carried in the payload section of the digital container to one or more user nodes serviced by the second network node, wherein the digital container is not routed to a user node and the payload section of the digital container includes transmissions for only the one or more user nodes serviced by the second network node.

14. A method for transporting signaling information in an optical communication network having interconnected network nodes and one or more user nodes coupled to network nodes, the method comprising:
   a) establishing a communications connection between a first and second network node by
      1) forming a first digital container at a first network node, the first digital container including signaling information for establishing a route between the first and second network nodes,
      2) routing the first digital container through the communication network using a channel identification field, and
      3) receiving and processing the first digital container at the second network node to thereby establish the communication connection; and
   b) establishing a signaling connection between a first and second user node, the first user node being coupled to the first network node and the second user node being coupled to the second network node, by
      1) forming a second digital container at a first network node, the second digital container including a header section and a payload section, wherein the payload section comprises one or more signaling messages supplied by the first user node,
      2) routing the second digital container through the communication network based on a channel identification field contained within the header section of the second digital container,
      3) receiving and processing the second digital container at the second network node, and
      4) routing the one or more signaling messages carried in the payload section of the second digital container to the second user node serviced by the second network node, such that a signaling connection is established between the first and second user nodes and the second digital container is not routed to a user node.

15. A system for transporting information in an optical communication network having interconnected network nodes and one or more user nodes coupled to network nodes, the system comprising:
   in a first network node,
      a processor for forming a digital container including a header section and a payload section, wherein the payload section carries a plurality of separate transmissions, each transmission formatted according to one of many different protocols, and
      a routing element for routing the digital container to a second network node based on a channel identification field contained within the header section of the digital container; and
   in a second network node, a processor for receiving and processing the digital container and routing the separate transmissions carried in the payload section of the digital container to one or more user nodes serviced by the second network node, wherein the payload section of the digital container includes transmissions for only the one or more user nodes serviced by the second network node and the digital container is not routed to a user node.

16. In an optical communication network having a plurality of network nodes and one or more user nodes coupled to one or more of the plurality of network nodes, a first network node for transporting information in the communication network comprising:
   a processor operable to form a digital container including a header section and a payload section, wherein the payload section carries a plurality of separate transmissions, each transmission formatted according to one of many different protocols and further operable to address the digital container for routing to a second network node; and
   a routing element for routing the digital container to a second network node based on a channel identification field contained within the header section of the digital container,
   wherein the payload section of the digital container includes information for only the one or more user nodes serviced by the second network node and the digital container is not routed to a user node.

17. In an optical communication network having a plurality of network nodes and one or more user nodes coupled to one or more of the plurality of network nodes, a destination network node for transporting information in the communication network comprising:
   means for receiving a digital container transmitted by a first network node using a channel identification field corresponding to the digital container, the digital container including a header section and a payload section, wherein the payload section carries a plurality of separate transmissions, each transmission formatted according to one of many different protocols; and
   means for processing the digital container and for routing the separate transmissions carried in the payload section of the digital container to one or more user nodes serviced by the second network node, wherein the payload section of the digital container includes transmission for only the one or more user nodes serviced by the second network node and the digital container is not routed to a user node.

* * * * *